United States Patent
Kim et al.

(10) Patent No.: US 10,003,444 B2
(45) Date of Patent: Jun. 19, 2018

(54) COMMUNICATION METHOD USING MULTIPLE INPUT MULTIPLE OUTPUT AND COMMUNICATION APPARATUS PERFORMING THE SAME

(71) Applicant: ELECTRONICS AND TELECOMMUNICATIONS RESEARCH INSTITUTE, Daejeon (KR)

(72) Inventors: Kwi Hoon Kim, Daejeon (KR); Young Boo Kim, Sejong (KR); Hyun Jae Kim, Incheon (KR); Jin Tae Oh, Daejeon (KR); Woong Shik You, Sejong (KR); Sungwon Yi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 15/089,361

(22) Filed: Apr. 1, 2016

(65) Prior Publication Data

US 2016/0295570 A1 Oct. 6, 2016

(30) Foreign Application Priority Data

Apr. 3, 2015 (KR) .......................... 10-2015-0047641

(51) Int. Cl.
*H04W 4/00* (2018.01)
*H04L 5/00* (2006.01)
*H04B 7/0413* (2017.01)

(52) U.S. Cl.
CPC .......... *H04L 5/005* (2013.01); *H04B 7/0413* (2013.01)

(58) Field of Classification Search
CPC ............................. H04L 5/005; H04B 7/0413
See application file for complete search history.

(56) References Cited

U.S. PATENT DOCUMENTS

2009/0264142 A1\* 10/2009 Sankar ................. H04L 5/0007
455/501
2013/0122953 A1\* 5/2013 Zhang ................... H04W 24/02
455/517

(Continued)

FOREIGN PATENT DOCUMENTS

| KR | 10-2012-0099259 A | 9/2012 |
| KR | 10-2014-0094711 A | 7/2014 |
| WO | WO 2009/099810 A2 | 8/2009 |

OTHER PUBLICATIONS

Thomas L. Marzetta, "Noncooperative Cellular Wireless with Unlimited Numbers of Base Station Antennas", IEEE Transactions on Wireless Communications, Nov. 2010, pp. 3590-3600, vol. 9, No. 11, IEEE.

*Primary Examiner* — Afshawn M Towfighi

(57) ABSTRACT

Provided herein is a communication method using MIMO (Multiple-Input Multiple-Output) technology for communicating with a terminal included in each of a plurality of base station cells using a communication apparatus, the method including calculating, by the communication apparatus, the number of terminals included inside a base station cell; generating, by the communication apparatus, pilot signals corresponding to the calculated number of terminals; and allocating, by the communication apparatus, the pilot signals to a terminal that may maximize a network capacity based on the generated pilot signals.

9 Claims, 3 Drawing Sheets

(56) References Cited

U.S. PATENT DOCUMENTS

| | | |
|---|---|---|
| 2014/0204785 A1 | 7/2014 | Kim et al. |
| 2014/0355704 A1 | 12/2014 | Lee et al. |
| 2014/0376464 A1 | 12/2014 | Nam et al. |
| 2017/0104561 A1* | 4/2017 | Agardh ................... H04L 5/005 |
| 2017/0215182 A1* | 7/2017 | Yan ................... H04W 72/0413 |

* cited by examiner ded MIMO technology is generally used in a downward link mobile communication. In a base station using aggregated MIMO technology, a lot of antennas are installed. When a lot of antennas are installed in a transmitting end, a channel may be expressed in a very large random vector or matrix, wherein as the number of antennas increases infinitely, the random vector or matrix converge to a deterministic vector or matrix.

COMMUNICATION METHOD USING MULTIPLE INPUT MULTIPLE OUTPUT AND COMMUNICATION APPARATUS PERFORMING THE SAME

CROSS-REFERENCE TO RELATED APPLICATION

The present application claims priority to Korean patent application number 10-2015-0047641, filed on Apr. 3, 2015, the entire disclosure of which is incorporated herein in its entirety by reference.

BACKGROUND

Field of Invention

Various embodiments of the present disclosure relate to a communication method using MIMO (Multiple Input Multiple Output) technology, and more particularly, to a communication method using MIMO technology to identify the number of users of a base station cell that changes continuously in order to allocate an optimal number of pilot signals, and a communication apparatus using the same.

Description of Related Art

Aggregated MIMO technology is generally used in a downward link mobile communication. In a base station using aggregated MIMO technology, a lot of antennas are installed. When a lot of antennas are installed in a transmitting end, a channel may be expressed in a very large random vector or matrix, wherein as the number of antennas increases infinitely, the random vector or matrix converge to a deterministic vector or matrix.

That is, the fading effect that occurs in an actual wireless communication environment may disappear. Furthermore, when a beamforming is performed using a lot of antennas in a transmitting end, a very small beam width will be formed. Therefore, the interference between terminals will decrease, and in an ideal case, the interference will converge to zero (0). When using the aggregated MIMO technology, the problem of interference and fading will both be solved, and thus it will be possible to stably transmit a lot of data through a wireless channel at a very high transmission rate.

However, the aggregated MIMO technology has a limitation that exact channel information cannot be obtained due to frequency reuse of base stations. A pilot signal from inside another base station may be received in a current base station, and such a pilot signal from outside may interfere with a pilot signal received from a terminal inside the current base station, thereby leading to a problem where the terminal inside the current base station cannot obtain a perfectly exact channel information of a desired terminal.

SUMMARY

Therefore, various embodiments of the present disclosure are directed to a communication method using MIMO technology, the method including calculating the number of floating terminals included in a base station cell, generating pilot signals corresponding to the calculated number of floating terminals and allocating the pilot signals to the terminal so as to prevent interference between the terminal and base station, and to enable communication with a maximum network capacity, and a communication apparatus performing the same.

According to an embodiment of the present disclosure, there is provided a communication method using MIMO (Multiple-Input Multiple-Output) technology for communicating with a terminal included in each of a plurality of base station cells, the method including calculating, by the communication apparatus, the number of terminals included inside a base station cell; generating, by the communication apparatus, pilot signals corresponding to the calculated number of terminals; and allocating, by the communication apparatus, the pilot signals to a terminal that may maximize a network capacity based on the generated pilot signals.

According to the embodiment, the calculating may involve calculating the number of terminals included in the entire plurality of base station cells.

According to the embodiment, the calculating may involve calculating the number of terminals included in a first base station cell of the plurality of base station cells, and setting the number of terminals included in the rest of the plurality of base station cells to an arbitrary value.

According to the embodiment, the generating may involve generating the pilot signals corresponding to the number of terminals included in the entire plurality of base station cells.

According to the embodiment, the generating may involve generating the pilot signals corresponding to a result of adding the number of terminals included in the first base station cell and the arbitrary value.

According to the embodiment, the allocating may involve allocating the pilot signals to the terminal such that the terminal and a terminal located in an adjacent base station cell do not interfere with each other.

According to another embodiment of the present disclosure, there is provided a communication apparatus including a terminal calculator configured to calculate the number of terminals included inside a plurality of base station cells; a pilot generator configured to generate pilot signals corresponding to the calculated number of terminals; and a pilot allocator configured to allocate the pilot signals to a terminal that may maximize a network capacity based on the generated pilot signals.

In the embodiment, the apparatus may further include a terminal selector configured to select a terminal to allocate the pilot signals such that the network capacity is maximum.

In the embodiment, the apparatus may further include a network capacity calculator configured to calculate a network capacity of a communication system using the pilot signals allocated to the terminal inside each base station cell.

BRIEF DESCRIPTION OF THE DRAWINGS

The above and other features and advantages of the present disclosure will become more apparent to those of ordinary skill in the art by describing in detail embodiments with reference to the attached drawings in which.

DETAILED DESCRIPTION

Figure 1:
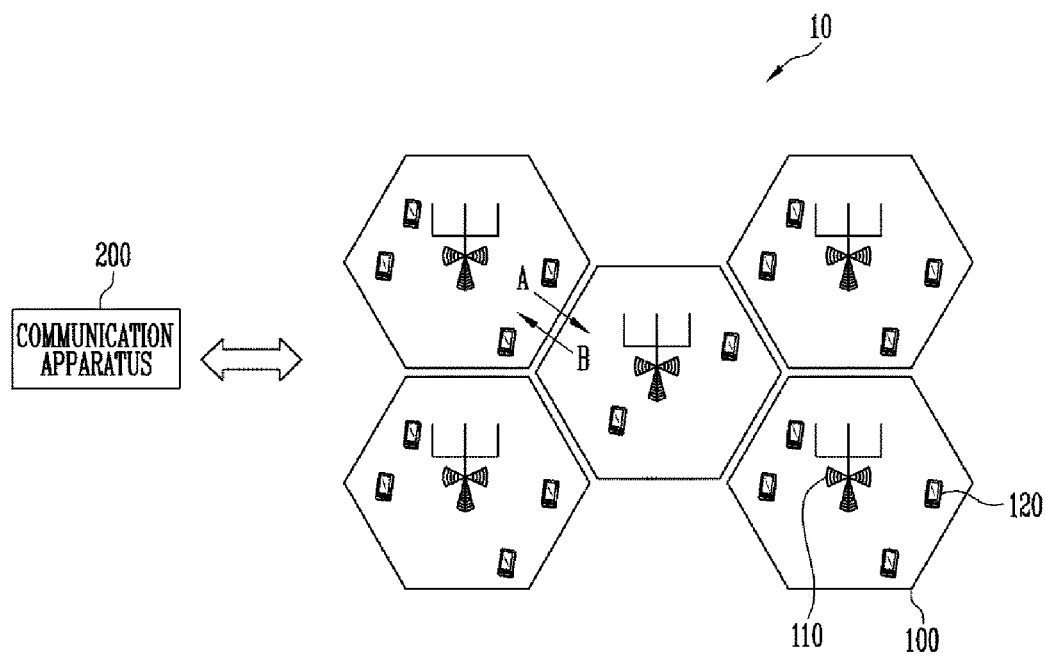
FIG. 1 is a conceptual view of a communication system using MIMO (Multiple-Input Multiple-Output) technology according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be predicted. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence. Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, embodiments of the present disclosure will be explained in detail with reference to the drawings attached.

FIG. 1 is a conceptual view of a communication system using MIMO (Multiple-Input Multiple-Output) technology according to an embodiment of the present disclosure.

Referring to FIG. 1, the communication system using MIMO according to an embodiment of the present disclosure 10 may consist of a plurality of base station cells 100 each including a base station 110 and terminal 120; and a communication apparatus 200.

For example, the communication system using MIMO 10 may be a multiple cell network system where the base station 110 and the terminal 120 inside the base station cell 100 communicate with each other.

The base station 110 may communicate with the terminal 120 inside the base station cell 100 using different antennas. For example, the base station 110 may include a greater number of antennas than the terminal 120.

The terminal 120 may be allocated by the communication apparatus 200 with a pilot signal for communicating with the base station 110, and may then communicate with the base station 110 according to the allocated pilot signal.

A user of the terminal 120 may move to another base station cell. As the user moves to another base station cell, the base station 110 that communicates with the terminal 120 may change.

For example, when a first user moves to an adjacent base station cell 100, a terminal (A) of the first user may stop communicating with a first base station, and newly communicate with a second base station in the moved area. Furthermore, the first base station may newly communicate with a terminal (B) of a second user coming from an adjacent base station cell.

The communication apparatus 200 may calculate a network capacity of the communication system 10 based on information on the pilot allocated to the terminal 120 located in each cell of the base station 100 and based on information on the terminal 120. The communication apparatus 200 may also control the base station 110 to maximize the network capacity.

For example, the communication apparatus 200 may calculate the number of floating terminals 120 inside the base station cell 100, and generate pilot signals according to the result of calculation, and perform communication. By doing this, the communication apparatus 200 may maximize the network capacity of the communication system using MIMO.

The communication apparatus 200 may allocate pilot signals such that the terminal 120 inside the base station cell 100 is not interfered by the adjacent base station cell 100.

For example, the communication apparatus 200 may perform a simulation of repeatedly changing pilot signals such that the terminal 120 inside the base station cell is not interfered by the adjacent base station cell, and may allocate pilot signals according to the result of the simulation to the corresponding terminal 120.

In an embodiment, the communication apparatus 200 may identify a pilot signal of an adjacent base station cell that may interfere with the terminal 120 inside the base station cell, and may allocate a pilot signal other than the identified pilot signal of the adjacent base station cell to the terminal 120 that is within an area of influence of the adjacent base station cell.

Figure 2:
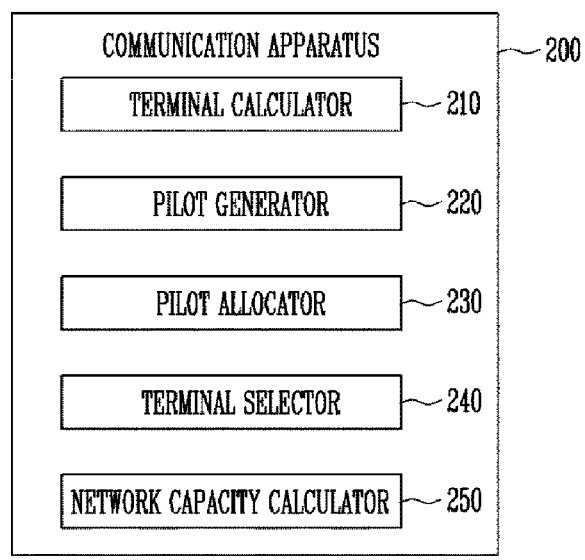
FIG. 2 is a block diagram of a communication apparatus according to an embodiment of the present disclosure.

FIG. 2 is a block diagram of a communication apparatus according to an embodiment of the present disclosure.

Referring to FIGS. 1 and 2, the communication apparatus 200 may include a terminal calculator 210, pilot generator 220, pilot allocator 230, terminal selector 240, and network capacity calculator 250.

The communication apparatus 200 may receive information on a pilot signal being allocated to the terminal 120, and information related to the terminal 120, and may allocate a pilot signal to the terminal 120 based on the received information and control the terminal 120 to communicate with the base station 110.

The terminal calculator 210 may calculate the number of terminals 120 included in the plurality of base station cells 100. For example, the terminal calculator 210 may calculate the number of terminals 120 included in each of the plurality of base station cells 100, and may calculate the sum of the number of the terminals 120 included in the entirety of the plurality of base stations 110.

The pilot generator 220 may generate a pilot signal to be allocated to the terminal 120. The pilot generator 220 may generate pilot signals corresponding to the number of terminals 120 calculated in the terminal calculator 210.

The pilot allocator 230 may allocate the pilot signals generated in the pilot generator 220 to the corresponding terminal 120. The pilot allocator 230 may allocate the pilot signals such that the terminal 120 selected by the terminal selector 240 is not interfered by the adjacent base station cell.

The terminal selector 240 may select a terminal 120 to which the pilot signal is allocated such that the network capacity of the communication system 10 is the maximum capacity. For example, the terminal selector 240 may select the terminal 120 that would not be interfered by the adjacent base station cell when a certain pilot signal is allocated.

The network capacity calculator 250 may calculate the network capacity of the communication system 10 using math formula 1.

[Math formula 1]

$$C_{j,k}^u = B_W\left(\frac{1}{\alpha}\right)\left(\frac{T_{block} - T_{pilot}}{T_{block}}\right)\left(\frac{T_u}{T_s}\right)\log_2(1 + SIR_{j,\varphi_k}^u)$$

$$= B_W\left(\frac{1}{\alpha}\right)\left(\frac{J \cdot T_s - \tau \cdot T_s}{JT_s}\right)\left(\frac{T_u}{T_s}\right)\log_2(1 + SIR_{j,\varphi_k}^u)$$

$$= B_W\left(\frac{1}{\alpha}\right)\left(\frac{J - \tau}{J}\right)\left(\frac{T_u}{T_s}\right)\log_2(1 + SIR_{j,\varphi_k}^u)$$

$$SIR_{j,\varphi_k}^u = \begin{cases} \dfrac{\beta_{j,\varphi_k j}^2}{\sum_{l=1,\lambda \ne j}^{L} \beta_{j,\varphi_k l}^2}, & \varphi_k \in \Omega_j \\ 0, & \varphi_k \text{ not} \in \Omega_j \end{cases}$$

$$C_{network}^u = \sum_{j=1}^{L}\sum_{k=1}^{U_j} C_{j,k}^u$$

Herein, variables included in math formula 1 may be defined according to math formula 2.

[Math Formula 2]

$U_j$ (the number of user in j-th cell) and $K^{max}$ (the max pilots in one cell)

J: OFDM symbols, τ: pilot symbols, $T_c$: Coherence time, $T_s$: OFDM symbol interval, $B_c$: Coherence BW, Δf: frequency spacing α: reuse factor, $T_{block}=JT_s$, $T_{pilot}=\tau T_s$, $T_u$: Data transmission interval, $C_{j,k}^u$ The capacity of j-th cell, k-th user In case of uplink $SIR_{j,k}^u$ Signal Intereference Ratio of j-th cell, k-th user In case of uplink $\beta_{j,k,l}$ The pathless and the shadowing between the k-th terminal in the j-th cell and the base station in the l-th cell $C_j^u$ The sum capacity of the j-th cell $C_{network}^u$ The total network capacity of L cells $C_{j,k}^d$ The capacity of j-th cell, k-th user In case of downlink $SIR_{j,k}^d$ Signal Interference Ratio of j-th cell, k-th user In case of downlink $C_j^d$ The sum capacity of j-th cell $C_{network}^d$ The total network capacity of L cells $\Omega_j$: Used pilot set in the j-th cell, $\varphi_k$: Assigned pilot for the k-th user Herein, $\Omega_j$ may be a set of pilot signals, and $\varphi_k$ may be any one of values belonging to the set of pilot signals. $C_{network}^u$ may be the capacity of the entire network, $N_{smooth}$ may be a constant number, and τ may be a variable. The pilot signal may be randomly allocated to a user to maximize the capacity of the entire network, and $C_{j,k}^u$ represents the capacity of the $k^{th}$ user from the $j^{th}$ base station. In an uplink, in the case of being allocated with $\varphi_k$ pilot signal in the $j^{th}$ base station, $SIR_{j,\varphi_k}^u$ may be a signal to noise ratio.

Figure 3:
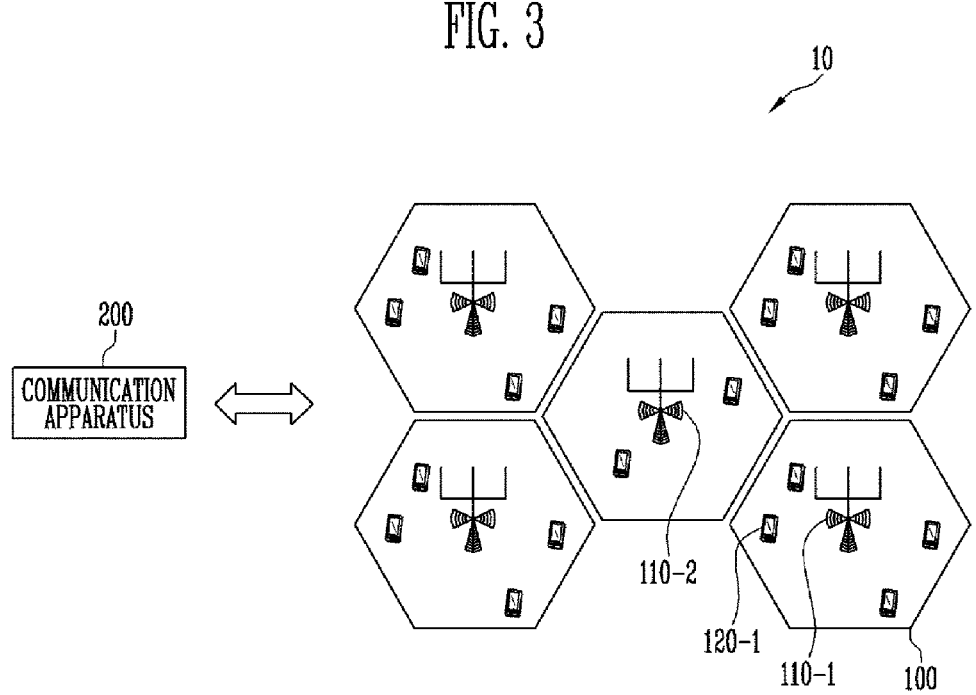
FIG. 3 is a conceptual view for explaining a communication method of a communication apparatus using MIMO technology according to an embodiment of the present disclosure.

FIG. 3 is a conceptual view for explaining a communication method of a communication apparatus using MIMO technology according to an embodiment of the present disclosure.

Referring to FIGS. 1 to 3, in order to perform a communication method using MIMO technology in a maximum network capacity, the communication apparatus 200 may generate pilot signals corresponding to the number of terminals 120 of the entire plurality of base station cells 100. That is, the communication apparatus 200 may calculate the floating number of terminals 120 in the entire plurality of base station cells 100, and generate pilot signals corresponding to the calculated number.

In an embodiment, the communication apparatus 200 may allocate any of the generated pilot signals to the terminal 120.

In another embodiment, the communication apparatus 200 may allocate pilot signals such that the terminal 120 is not interfered by the adjacent base station cell, and perform a communication method using MIMO technology in a maximum network capacity.

For example, since a first terminal 120-1 is in an adjacent position to a second base station 110-2, the first terminal 120-1 may be interfered by the second base station 110-2. For communication between the first base station 110-1 and the first terminal included in the base station cell, the communication apparatus 200 may allocate the pilot signal that is not interfered by the second base station 110-2 to the first terminal.

The communication apparatus 200 may select $C_{network}^u$ that maximizes the network capacity of the communication system using math formula 3.

[Math formula 3]

$$C_{network}^u(K^{max}, \Omega) = \sum_{j=1}^{L}\sum_{k=1}^{U_j} C_{j,k}^u =$$

$$\sum_{j=1}^{L}\sum_{k=1}^{U_j} B_W\left(\frac{1}{\alpha}\right)\left(\frac{J-\tau}{J}\right)\left(\frac{T_u}{T_s}\right)\log_2(1 + SIR_{j,\varphi_k}^u) =$$

$$\sum_{j=1}^{L}\sum_{k=1}^{U_j} B_W\left(\frac{1}{\alpha}\right)\left(\frac{J-\tau}{J}\right)\left(\frac{T_u}{T_s}\right)\log_2(1 + SIR_{j,\varphi_k}^u) =$$

$$\sum_{\varphi_k \in \Omega_j} B_W\left(\frac{1}{\alpha}\right)\left(\frac{J-\tau}{J}\right)\left(\frac{T_u}{T_s}\right)$$

$$\log_2\left(1 + \frac{\beta_{j,\varphi_k j}^2}{\sum_{l=1,\lambda \ne j}^{L} \beta_{j,\varphi_k \lambda}^2}\right) +$$

$$\sum_{\varphi_k \in \Omega_j}\sum_{l=1,l \ne j}^{L} B_W\left(\frac{1}{\alpha}\right)\left(\frac{J-\tau}{J}\right)\left(\frac{T_u}{T_s}\right)$$

$$\log_2\left(1 + \frac{\beta_{l,\varphi_k l}^2}{\beta_{l,\varphi_k j}^2 + \sum_{l=1,\lambda \ne 1}^{L} \beta_{l,\varphi_k \lambda}^2}\right) +$$

$$\sum_{\varphi_k \text{ not} \in \Omega_j}\sum_{l=1,l \ne j}^{L} B_W\left(\frac{1}{\alpha}\right)\left(\frac{J-\tau}{J}\right)\left(\frac{T_u}{T_s}\right)$$

$$\log_2\left(1 + \frac{\beta_{l,\varphi_k l}^2}{\sum_{l=1,\lambda \ne l}^{L} \beta_{l,\varphi_k \lambda}^2}\right)$$

$$(K^{max,opt}, \Omega^{opt}) = \arg\max_{(K^{max},\Omega)} C^u_{network}(K^{max}, \Omega)$$

$$\Omega^{opt} = \{\Omega_1^{opt}, \Omega_2^{opt}, \ldots, \Omega_L^{opt}\}$$

$$\Omega_j^{opt} = \{\text{The optimal pilots in } 1 \sim K^{max,opt}\}$$

$$U = \{U_1, U_2, \ldots, U_L\}$$

Herein, $C_{network}^u$ is the capacity of the entire network, and $C_{network}^u$ may be expressed as a function of $K^{max}$: and $\Omega$. $K^{max}$: is the number of maximum pilot signals that may be used in one base station 110, and $\Omega$ is a set of pilot signals allocated in all base stations 110.

$(K^{max,opt}, \Omega^{opt})$ represents the number of maximum pilot signals and the set of allocated pilot signals according to the number of the terminals 120. When the terminal set is U: in each base station, in the $j^{th}$ base station, $\Omega_j^{opt}$ may be a set of allocated pilot signals (for example, $\Omega_j^{opt}$ may be any one of 1 to $K^{max,opt}$).

The communication apparatus 200 may calculate $(K^{max,opt}, \Omega^{opt})$ through the exhaustive search method by changing $\tau$, $\Omega$, $\varphi_k$ according to U in $C_{network}^u$.

Therefore, the communication apparatus 200 may generate pilot signals corresponding to the calculated $\Omega^{opt}$, and allocate the generated pilot signals to each terminal 120, thereby maximizing the network capacity of the communication system 10.

Figure 4:
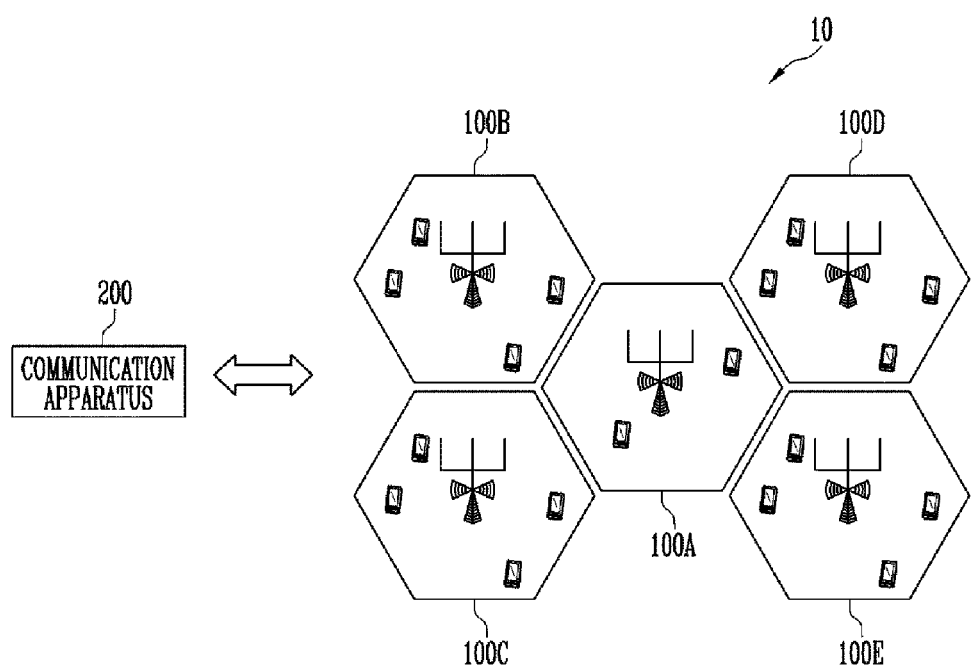
FIG. 4 is a conceptual view for explaining a communication method of a communication apparatus using MIMO technology according to another embodiment of the present disclosure.

FIG. 4 is a conceptual view for explaining a communication method of a communication apparatus using MIMO technology according to another embodiment of the present disclosure.

Referring to FIGS. 1, 2, and 4, the communication apparatus 200 may calculate the number of terminals 120 included in one of the plurality of base station cells 100, and set the number of the terminals 120 included in the rest of the base station cells 100 to an arbitrary value, thereby maximizing the network capacity of the communication system.

For example, the communication apparatus 200 may calculate the number of terminals 120 included in the first base station cell 100A, and may set the number of terminals 120 included in the rest of the base station cells 100B, 100C, 100D and 100E to an arbitrary value. The communication apparatus 200 may add the number of terminals 120 included in the first base station cell 100A and the arbitrary value, and generate pilot signals according to the result of adding.

Furthermore, the communication apparatus 200 may allocate the pilot signals to the terminal 120 such that the terminal 120 is not interfered by the adjacent base station cell, thereby performing a communication method using MIMO technology in a maximum network capacity.

The communication apparatus 200 may select $C_{network}^u$ that maximizes the network capacity of the communication system 10 using math formula 4.

[Math formula 4]

$$C_j^u(K_j^{max}, \Omega_j) = \sum_{k=1}^{U_j} C_{j,k}^u$$

$$= \sum_{k=1}^{U_j} B_W \left(\frac{1}{\alpha}\right)\left(\frac{J-\tau}{J}\right)\left(\frac{T_u}{T_s}\right) \log_2\left(1 + SIR_{j,\varphi_k}^u\right)$$

$$= \sum_{\varphi_k \in \Omega_j} B_W \left(\frac{1}{\alpha}\right)\left(\frac{J-\tau}{J}\right)\left(\frac{T_u}{T_s}\right) \log_2\left(1 + \frac{\beta_{j,\varphi_k j}^2}{\sum_{l=1,\lambda \neq l}^{L} \beta_{l,\varphi_k \lambda}^2}\right)$$

$$(K_j^{max,subopt\_j}, \Omega_j^{opt}) = \arg\max_{(K_j^{max},\Omega_j)} C_j^u(K_j^{max}, \Omega_j)$$

$$\Omega_j^{opt} = \{\text{optimal pilots in } 1 \sim K_j^{max,opt}\}$$

Herein, $C_j^u(K_j^{max}, \Omega_j)$ is the capacity of the $j^{th}$ base station, and $(K_j^{max,subopt\_1}, \Omega_j^{opt})$ is the number of the pilot signals and a set of the pilot signals for the user. $\Omega_j^{opt}$ and $\Omega_j^{opt}$ is a set of pilot signals allocated to the $j^{th}$ base station, which may be set within a range of $1 \sim K_j^{max,opt}$.

In the case of math formula 4, only the number of terminals 120 of one certain base station cell (for example, $j^{th}$ base station) may be changed, and the number of pilot signals of the rest of the base station cells may be constant. That is, the communication apparatus 200 may calculate the number of pilot signals having the maximum capacity in the $j^{th}$ base station, and may set an arbitrary value in the rest of the base stations.

The communication apparatus 200 may calculate $(K_j^{max,subopt\_1}, \Omega_j^{opt})$ in the exhaustive search method by changing $\tau$, $\Omega_j$, $\varphi_k$ according to $U_j$ in formula $C_j^u(K_j^{max}, \Omega_j)$.

Therefore, the communication apparatus 200 may generate pilot signals corresponding to the calculated $(K_j^{max,subopt\_1}, \Omega_j^{opt})$, and allocate the generated pilot signals to each terminal 120, thereby maximizing the network capacity of the communication system.

Figure 5:
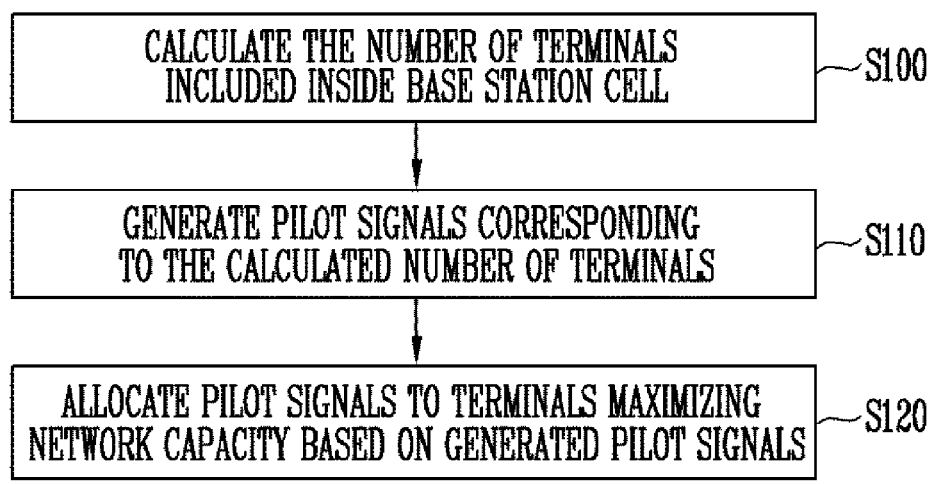
FIG. 5 is a flowchart for explaining a communication method using MIMO technology according to an embodiment of the present disclosure.

FIG. 5 is a flowchart for explaining a communication method using MIMO technology according to an embodiment of the present disclosure.

Referring to FIGS. 1, 2, and 5, in the communication method using MIMO technology performing communication with the terminal 120 included in each of the plurality of base station cells, the communication apparatus 200 may calculate the number of terminals 120 included inside the base station cell 100 (S100).

The communication apparatus 200 may generate pilot signals corresponding to the calculated result (S110).

The communication apparatus 200 may allocate the pilot signals to the terminal 120 that may maximize the network capacity based on the generated pilot signals (S120).

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A communication method using aggregated MIMO (Multiple-Input Multiple-Output) technology to communicate with one or more terminal in a cellular telecommunications network, the method comprising:
   calculating, by a communication apparatus, a number of terminals included inside a first base station cell;
   generating, by the communication apparatus, pilot signals corresponding to the calculated number of terminals; and
   allocating, by the communication apparatus, the pilot signals to a first terminal so that a network capacity is maximized based on the generated pilot signals,
   wherein the calculating comprises calculating the number of terminals included in the first base station cell of the plurality of base station cells, and setting a number of terminals included in the rest of the plurality of base station cells to an arbitrary value.

2. The method according to claim 1,
   wherein the calculating comprises calculating a number of terminals included in a plurality of base station cells including the first base station cell.

3. The method according to claim 2,
   wherein the generating comprises generating the pilot signals corresponding to the number of terminals included in the entire plurality of base station cells.

4. The method according to claim 2,
   wherein the allocating comprises allocating the pilot signals to the first terminal such that the first terminal and a terminal located in an adjacent base station cell do not interfere with each other.

5. The method according to claim 1,
   wherein the generating comprises generating the pilot signals corresponding to a result of adding the number of terminals included in the first base station cell and the arbitrary value.

6. A communication apparatus in a cellular telecommunications network, the apparatus comprising:
   a terminal calculator configured to calculate a number of terminals included inside a plurality of base station cells;
   a pilot generator configured to generate pilot signals corresponding to the calculated number of terminals; and
   a pilot allocator configured to allocate the pilot signals to a first terminal so that a network capacity is maximized based on the generated pilot signals when aggregated MIMO is used to communicate with the first terminal,
   wherein the calculator calculates a number of terminals included in a plurality of base station cells including the first base station cell.

7. The apparatus according to claim 6,
   further comprising a terminal selector configured to select a terminal to allocate the pilot signals to such that the network capacity is maximized.

8. The apparatus according to claim 6,
   further comprising a network capacity calculator configured to calculate a network capacity of a communication system using the pilot signals allocated to a terminal inside the base station cell.

9. A communication method using aggregated MIMO (Multiple-Input Multiple-Output) technology to communicate with one or more terminal in a cellular telecommunications network, the method comprising:
   calculating, by a communication apparatus, a number of terminals included inside a first base station cell;
   generating, by the communication apparatus, pilot signals corresponding to the calculated number of terminals; and
   allocating, by the communication apparatus, the pilot signals to a first terminal so that a network capacity is maximized based on the generated pilot signals,
   wherein the calculating comprises calculating a number of terminals included in the first base station cell and setting a number of terminals in remaining base stations of the plurality of base station cells to an arbitrary value,
   wherein the generating comprises generating the pilot signals corresponding to the number of terminals included in the entire plurality of base station cells, and
   wherein the allocating comprises allocating the pilot signals to the first terminal such that the first terminal and a terminal located in an adjacent base station cell do not interfere with each other.

* * * * *